United States Patent [19]
Kelley

[11] 3,831,299
[45] Aug. 27, 1974

[54] CABLE LAYING PLOW EQUIPPED WITH A CUTTING CHAIN

[76] Inventor: Leon O. Kelley, P.O. Box 488, Stamford, Tex. 79553

[22] Filed: Sept. 28, 1972

[21] Appl. No.: 292,898

[52] U.S. Cl. ............... 37/191 A, 37/2 R, 37/86, 37/193
[51] Int. Cl. ............... E02f 3/10, E02f 5/06
[58] Field of Search ............... 37/83, 193, 86, 94, 2, 37/191 A, 192 A; 61/72.6

[56] References Cited
UNITED STATES PATENTS

| | | | |
|---|---|---|---|
| 915,963 | 3/1909 | Hovland | 37/86 UX |
| 1,303,399 | 5/1919 | Ryan | 37/193 UX |
| 2,711,623 | 6/1955 | Horan | 37/191 A |
| 2,769,278 | 11/1956 | Wassell et al. | 37/2 R |
| 3,011,278 | 12/1961 | Lust | 37/193 |
| 3,024,546 | 3/1962 | Cramer | 37/191 A X |
| 3,394,554 | 7/1968 | Kinnan | 37/94 UX |
| 3,521,387 | 7/1970 | Degelman | 37/66 |
| 3,738,029 | 6/1973 | Harmon | 37/66 |

FOREIGN PATENTS OR APPLICATIONS

| | | | |
|---|---|---|---|
| 104,989 | 10/1964 | Norway | 37/86 |
| 122,188 | 12/1957 | U.S.S.R. | 61/72.6 |

*Primary Examiner*—Clifford D. Crowder
*Attorney, Agent, or Firm*—Richards, Harris & Medlock

[57] ABSTRACT

A cable laying plow includes a plow shank having a vertically extending forward edge. Sprockets are positioned at the upper and lower ends of the plow shank and a roller chain is supported on the sprockets for movement around a course including a portion extending along the forward edge of the plow shank. Knife blades are mounted at spaced intervals on the chain, and a stationary cutter bar extends forwardly from the plow shank for cooperation with the knife blades on the chain to effect cutting. A hydraulic motor is mounted on the upper end of the plow shank and drives the chain through the upper sprocket. A plow toe is mounted at the lower end of the plow shank and surrounds the lower sprocket for the protection thereof. The plow toe extends forwardly to a detachable point located substantially forwardly of the forward edge of the plow shank.

1 Claim, 3 Drawing Figures

CABLE LAYING PLOW EQUIPPED WITH A CUTTING CHAIN

BACKGROUND AND SUMMARY OF THE INVENTION

This invention relates generally to plows having vegetation cutting structure, and more particularly to a cable laying plow equipped with a cutting chain.

The co-pending application of applicant, Ser. No. 188,030, filed Oct. 12, 1971, now U.S. Pat. No. 3,777,500, for Plow Having a Reciprocating Blade Attachment discloses a cable laying plow including a plow shank and an elongated frame slidably supported on the forward edge of the plow shank. The frame is equipped with cutting teeth, and a motor is mounted on the plow shank for reciprocating the frame and the teeth thereon. By this means the frame functions to cut through vegetation and the like that might otherwise accumulate in the path of the plow during plowing operations.

The use of the foregoing reciprocating blade structure on a cable laying plow has been found to provide a number of advantages. Thus, grass and other vegetation are continuously cleared from the path of the plow, whereby any possibility of an accumulation of these materials is automatically eliminated. It has also been found that the draft necessary to operate the plow is substantially reduced. Finally, the swell of the furrow formed by the plow is substantially reduced, which in turn reduces the cleanup operations necessary after plowing in a length of cable. These advantages are believed to arise due to the teeth on the frame cutting through the earth, as well as cutting through accumulated vegetation.

The present invention relates to an improvement over the above-described prior invention of applicant. In accordance with the broader aspects of the invention, a plow includes an endless cutting member mounted on the plow shank for movement around a course including a portion extending along the forward edge of the plow shank. By this means the endless cutting member functions to cut both the earth and vegetation lying in the path of the plow. The use of the invention provides the same advantages as applicant's prior invention, and further provides a smooth, continuous mode of operation resulting in long-term, maintenance-free service.

In accordance with more specific aspects of the invention, a pair of sprockets are positioned at the upper and lower ends of the plow shank. The endless cutting member comprises a roller chain constrained around the sprockets and a plurality of knife blades mounted at spaced points on the roller chain. A hydraulic motor operates through the upper sprocket to effect upward movement of the knife blades along the forward edge of the plow shank, and a stationary cutter bar is mounted on the plow shank for cooperation with the knife blades to effect cutting. A plow toe is mounted on the plow shank and surrounds the lower sprocket for the protection thereof. The plow toe extends to a detachable point mounted forwardly on the forward edge of the plow shank.

DESCRIPTION OF THE DRAWING

A more complete understanding of the invention may be had by referring to the following Detailed Description when taken in conjunction with the accompanying drawing, wherein.

DETAILED DESCRIPTION

Figure 1:
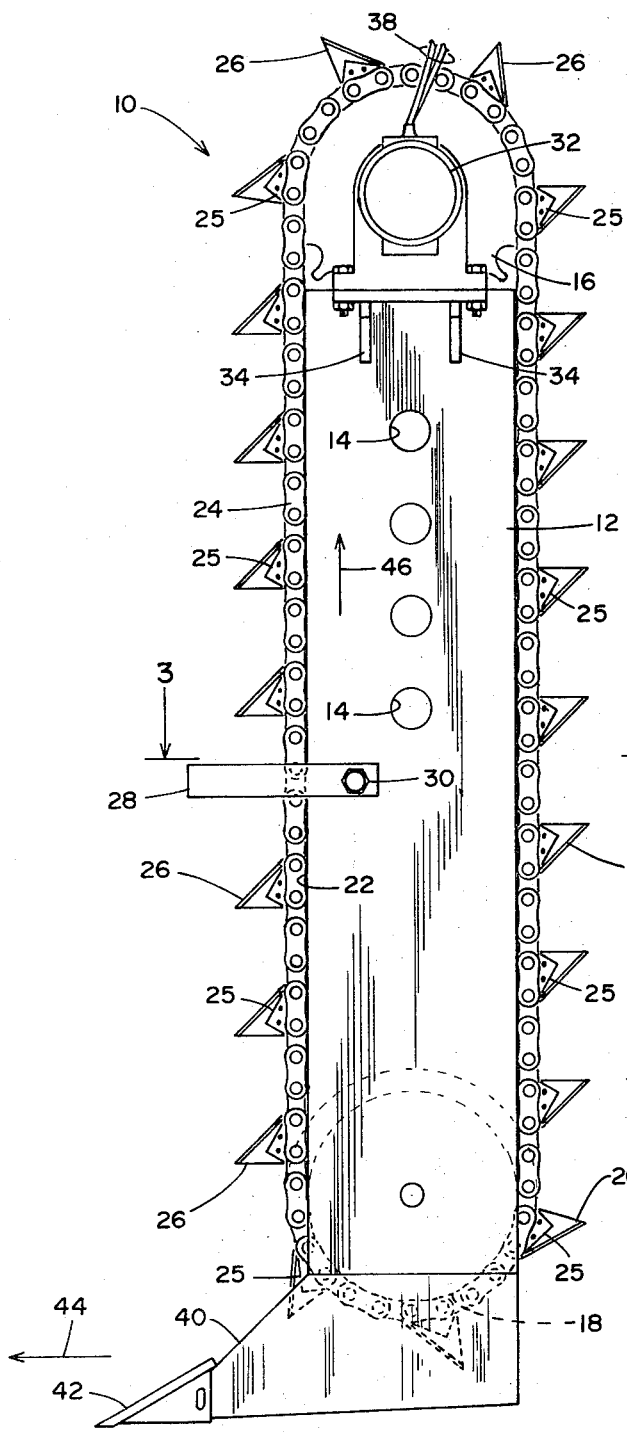
FIG. 1 is a side view of a plow incorporating the invention.

Referring now to the Drawing, there is shown a plow 10 incorporating the present invention. The plow 10 includes a plow shank 12 having a plurality of attachment holes 14 formed therethrough. By this means the plow shank is connected to a tool bar comprising part of a plow supporting and positioning apparatus. The plow positioning and supporting apparatus is in turn supported on a prime mover, such as a tractor, which supplies operating power for the plow 10. For a more complete understanding of the construction and operation of such a plow supporting and positioning apparatus and its relationship to a prime mover, reference may be had to applicant's co-pending application Ser. No. 188,030, filed Oct. 12, 1971, now U.S. Pat. No. 3,777,500, and to Applicant's prior U.S. Pat. No. Re.26,718, granted Nov. 18, 1969, the specifications of which are incorporated herein by reference as if fully set forth herein.

Figure 2:
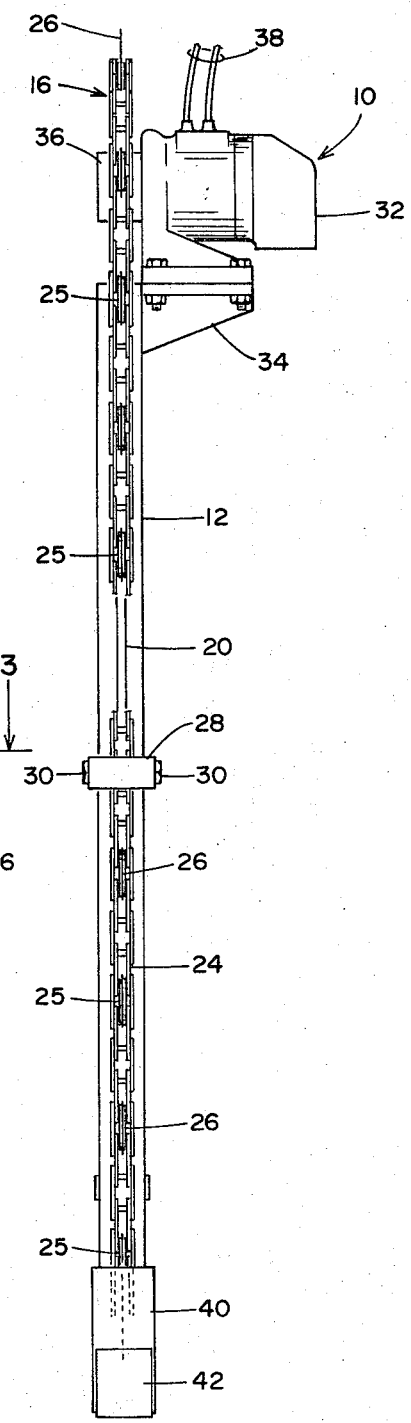
FIG. 2 is a front view of the plow.

In accordance with the present invention, a pair of sprockets 16 and 18 are positioned at the upper and lower ends of the plow shank 12, respectively. Also as is best shown in FIG. 2, the plow shank 12 is provided with guide structure 20. There is thus defined a course extending around the plow shank 12 and including a portion extending along the forward edge 22 thereof.

A roller chain 24 is supported on the sprockets 16 and 18 for movement around the course. The roller chain 24 supports a plurality of lugs 25, which are mounted at spaced intervals on the roller chain 24 for movement around the course. Knife blades 26 are attached within the lugs 25 by pins. The blades 26 are removable from the lugs 25 to enable replacement of the blades. A stationary cutter bar 28 is supported on the plow shank 12 by means of a pair of bolts 30. The cutter bar 28 extends forwardly of the forward edge 22 of the plow shank 12 for cooperation with the knife blades 26 to effect cutting.

The roller chain 24 of the plow 10 is driven by a hydraulic motor 32 which is supported at the upper end of the plow shank 12 on a bracket 34. As is most clearly shown in FIG. 2, the motor 32 comprises an output shaft 36 which supports the sprocket 16. Operating power for the motor 32 is received from the prime mover by means of hydraulic fluid which is directed to and returned from the motor 32 through a pair of lines 38.

The plow 10 further includes a plow toe 40 which is secured to the lower end of the plow shank 12, such as by welding. The plow toe 40 surrounds the lower sprocket 18 for the protection thereof. The plow toe 40 extends to a detachable point 42 positioned substantially forwardly of the forward edge 22 of the plow shank 12.

In the use of the plow 10, the prime mover is actuated to move the plow shank 12 in the direction of the arrow 44. At the same time the hydraulic motor 32 operates through the upper sprocket 16 and the roller chain 24 to move the knife blades 26 upwardly along the forward edge 22 of the plow shank 12 in the direction of the arrow 46. By this means the knife blades 26 function to cut both the earth and any vegetation which may be in the path of the plow 10.

Figure 3:
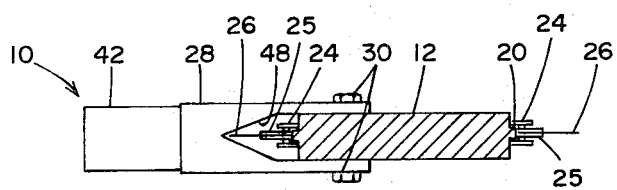
FIG. 3 is a sectional view taken generally along the line 3—3 in FIG. 2 in the direction of the arrows.

As is best shown in FIG. 3, the knife blades 26 pass through a hollow portion 48 formed in the stationary cutter bar 28 as they move upwardly along the forward edge 22 of the plow shank 12 under the action of the hydraulic motor 32. By this means the cutter bar 28 cooperates with the knife blades 26 to effect cutting. Thus, in the event vegetation tends to move upwardly with the knife blades 26 it becomes lodged between the moving knife blades 26 and the stationary cutter bar 28, whereby thorough cutting of the vegetation is assured.

As will be appreciated by those skilled in the art, the plow 10 illustrated in the drawing is readily adapted for use as a part of a cable laying system. In such a case, cable guiding structure will extend along the rear edge of the plow shank and then rearwardly at a depth corresponding to the positioning of the detachable point 42. A more complete understanding of the manner in which the present plow may be utilized in such a cable laying system may be had by reference to the above-identified prior application and Patent of Applicant.

It will thus be understood that in accordance with the present invention there is provided a plow comprising a plow shank and an endless cutting member supported for movement around a course including a portion extending along the forward edge of the plow shank to effect relative cutting motion with respect thereto. The use of the invention is highly advantageous in that both the earth and any vegetation lying in the path of the plow are automatically and continuously cut, whereby both the draft required to operate the plow and the swell of the furrow made by the plow are substantially reduced. Another advantage to the use of the invention is that cutting is carried out on a smooth and continuous basis, whereby the present invention provides long-term, maintenance-free service.

Although specific embodiments of the invention have been illustrated in the accompanying Drawing and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A plow comprising:

a normally vertically extending plow shank defining a forward edge, sprocket means positioned at the upper and lower ends of the plow shank to define a continuous course including a portion extending along the forward edge of the plow shank, hydraulic motor means mounted on the plow shank at the upper end thereof and drivingly connected to said sprocket means, a continuous chain constrained around the sprocket means for movement around the continuous course under the action of said motor means, a plurality of knife blades mounted at spaced intervals on said chain and extending outwardly in the plane of said plow shank for vertical cutting movement along the forward edge of the plow shank under the action of the motor means, each of said knife blades having at least one cutting edge thereon such that vegetation is cleared from the path of the plow shank and wherein the swell of the furrow formed by the plow shank is minimized, said knife blades moving upwardly along the forward edge of the plow shank under the action of said motor means, a stationary cutter bar mounted on the plow shank at the forward edge thereof for cooperation with the knife blades to effect cutting and for preventing vegetation from being carried upwardly by the chain, and a plow toe surrounding the sprocket means at the lower end of the plow shank for the protection thereof and extending to an imperforate, detachable point located forward of the forward edge of the plow shank to form a cable receiving passageway in the earth.

* * * * *